(12) United States Patent
Sadakata et al.

(10) Patent No.: US 7,198,296 B2
(45) Date of Patent: Apr. 3, 2007

(54) ELECTRIC POWER STEERING APPARATUS

(75) Inventors: Kiyoshi Sadakata, Gunma-ken (JP); Kiyoharu Higashino, Gunma-ken (JP); Akira Aida, Gunma-ken (JP); Yuji Kawaike, Gunma-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/520,353

(22) PCT Filed: Jul. 3, 2003

(86) PCT No.: PCT/JP03/08468
§ 371 (c)(1),
(2), (4) Date: Jan. 4, 2005

(87) PCT Pub. No.: WO2004/005108
PCT Pub. Date: Jan. 15, 2004

(65) Prior Publication Data
US 2005/0258627 A1 Nov. 24, 2005

(30) Foreign Application Priority Data
Jul. 8, 2002 (JP) ............... 2002-198962

(51) Int. Cl.
*B62D 1/18* (2006.01)
(52) U.S. Cl. .................... 280/775; 74/493
(58) Field of Classification Search ........ 280/775, 280/777, 779
See application file for complete search history.

(56) References Cited

U.S. PATENT DOCUMENTS

| | | | |
|---|---|---|---|
| 2,464,856 A * | 3/1949 | Finley ................ | 74/493 |
| 4,612,822 A | 9/1986 | Nishikawa et al. ...... | 74/493 |
| 4,815,765 A * | 3/1989 | Peterson ............... | 280/775 |
| 5,048,364 A * | 9/1991 | Minamoto et al. ....... | 74/493 |
| 6,390,505 B1 * | 5/2002 | Wilson ................ | 280/775 |
| 6,431,601 B2 * | 8/2002 | Maekawa .............. | 280/777 |
| 2002/0167157 A1* | 11/2002 | Matsumoto et al. ..... | 280/777 |
| 2005/0029795 A1* | 2/2005 | Camp et al. ........... | 280/777 |
| 2005/0081675 A1* | 4/2005 | Oshita et al. .......... | 74/493 |
| 2005/0173914 A1* | 8/2005 | Sadakata et al. ....... | 280/777 |
| 2006/0097501 A1* | 5/2006 | Yoshimoto et al. ..... | 280/777 |

FOREIGN PATENT DOCUMENTS

| | | |
|---|---|---|
| DE | 3421795 | 12/1984 |
| JP | UM 57-12360 | 1/1982 |
| JP | 59-231242 | 12/1984 |
| JP | 11-291920 | 10/1999 |
| JP | 11-301492 | 11/1999 |
| JP | 2000-85596 | 3/2000 |

(Continued)

*Primary Examiner*—Eric Culbreth
*Assistant Examiner*—Barry Gooden, Jr.
(74) *Attorney, Agent, or Firm*—Miles & Stockbridge P.C.

(57) ABSTRACT

An electric power steering apparatus includes a steering shaft having its upper end to which a steering wheel is fitted, a steering column rotatably supporting the steering shaft, tilting about a pivot as a fulcrum and moving telescopically together the steering shaft in axis-directions, an electric assist motor unit attached to the steering column and serving for a steering assist of the steering wheel, and a tilt/telescopic adjustment means for fixing the steering column in a predetermined angular position and fixing the steering column in a predetermined axis-directional position, wherein the pivot is disposed between the electric motor unit and the tilt/telescopic adjustment means.

2 Claims, 4 Drawing Sheets

FOREIGN PATENT DOCUMENTS

| | | |
|---|---|---|
| JP | 2000-159043 | 6/2000 |
| JP | 2000-211533 | 8/2000 |
| JP | 2002-2502 | 1/2002 |
| JP | 2003-40114 | 2/2003 |
| WO | WO 2004106141 A1 * | 12/2004 |

* cited by examiner

ELECTRIC POWER STEERING APPARATUS

TECHNICAL FIELD

The present invention relates generally to an electric power steering apparatus, and more particularly to a technology contrived for attaining smooth operations of a telescopic adjustment and of a tilt adjustment, and so on.

BACKGROUND ARTS

A steering system for an automobile widely adopts a so-called power steering apparatus for having a steering assist performed by use of an external power source.

Generally, the power source for the power steering apparatus has hitherto involved the use of a vane type hydraulic pump that is driven by an engine in many cases. This type of power steering apparatus has, however, a large drive loss of the engine as the hydraulic pump is driven without interruption (the drive loss is on the order of several hp (horsepower) to several tens of hp when at the maximum load). It is therefore difficult to adopt this power steering apparatus for mini-sized motor vehicles, etc. having a small displacement, and a traveling fuel efficiency of even an automobile having a comparatively large displacement inevitably decreases down to an unignorable degree.

Such being the case, over the recent years, an emphasis for solving these problems has been placed on an electric power steering (which will hereinafter be abbreviated to EPS) apparatus employing an electric motor as a power source. The EPS exhibits features, wherein the EPS uses an on-vehicle battery as a power source of the electric motor and therefore has no direct drive loss of the engine, a decline of traveling fuel efficiency (which is a drive loss of the engine related to an alternator) can be restrained as the electric motor is started up only when in the steering assist, and in addition execution of the electronic control can be highly facilitated. Note that the EPS is classified into a column assist type, a rack assist type, etc., depending on where the electric motor is installed, however, at the present the most-widespread type is the column assist type having merits in terms of a manufacturing cost, a space, and so on. It should be noted that a general version of the column assist type electric power steering apparatuses is that the steering shaft, as disclosed in Japanese Patent Application Laid-Open No. 2000-855596, gets collapsed upon receiving a predetermined impact load in order to relieve a secondary collision of an occupant (driver) with the steering wheel when an automotive vehicle encounters the (primary) collision.

On the other hand, the steering apparatus of the automobile is used (steered) by a majority of unspecified drivers, and it is therefore desirable that a position of the steering wheel can be adjusted corresponding to an individual physique, a driving posture, etc. For meeting such a request, there increases the number of trucks or lorries and the like without being limited to the passenger cars, which adopt a tilt adjustment mechanism and a telescopic adjustment mechanism. The tilt adjustment mechanism is a mechanism for adjusting a position of the steering wheel in up-and-down directions. The tilt adjustment mechanism is constructed of a tilt pivot for supporting the steering column in a swingable manner, a tilt lever for fixing the steering column in a desired position (at a desired tilt angle), and so on. Further, the telescopic adjustment mechanism is a mechanism for adjusting the position of the steering wheel in the front-and-rear directions (in the axis-directions of the steering shaft). The telescope adjustment mechanism is constructed of a telescopic portion of a double-pipe type or the like that serves for lengthening or shortening the steering shaft, a telescopic lever for fixing the steering shaft in a desired position (with a desired lengthening or shortening quantity), and so forth.

The column assist type electric power steering apparatus provided with both of the tilt adjustment mechanism and the telescopic adjustment mechanism, is exemplified by what is disclosed in Japanese Patent Application Laid-Open Nos. 11-301492 and 2000-211533, etc. Those electric power steering apparatuses, however, present a problem, wherein smooth operations of the telescopic adjustment and the tilt adjustment were not attained due to such a layout that the tilt pivot is disposed at a lower end of the steering column.

For example, as illustrated in FIG. 5, a comparatively heavy electric assist mechanism 17 structured of an electric motor, a speed reducing gear, etc. is attached to a steering column 1. When making the tilt/telescopic adjustments, however, a weight of this electric assist mechanism 17 is applied to between the tilt pivot 31 and the steering wheel, and consequently a large bending stress acts on a fitting slide portion 71 between an upper column 13 and a lower column equivalent member 15 that configure a telescopic mechanism. As a result, this larger bending stress and incapacity of increasing a length L of the fitting slide portion 71 because of an existence of the electric assist mechanism 17, are combined into an occurrence of torsional blocking between the upper column 13 and the lower column equivalent member 15, with the result that the telescopic adjustment operation can not be smoothly performed. This unsmoothed operation is conspicuous because of a single-hand telescopic operation conducted in a way that releases a lever with one hand while grasping the steering while with the other hand.

In the case of increasing the length L of the fitting slide portion 71 in order to improve this problem, a problem arises, wherein a collapsing stroke of the steering upper shaft 9 decreases as well as a telescopic stroke S, a degree of freedom for the telescopic adjustment decreases, and at the same time safety of the occupant (driver) against the secondary collision is hindered. Moreover, when in the tilting operation, a total weight of the steering column 1 including the electric assist mechanism 17 acts on the tilt pivot 31 as a fulcrum, and hence a smooth tilting operation still remained unperformable even by use of a tilt assist spring 65 having large spring force.

DISCLOSURE OF THE INVENTION

It is an object of the present invention, which was devised under such circumstances, to provide an electric power steering apparatus contrived for attaining smooth telescoping and tilting operations.

To accomplish the above object, an electric power steering apparatus according to the present invention, includes a steering shaft having its upper end to which a steering wheel is fitted, a steering column rotatably supporting the steering shaft, tilting about a tilt pivot as a fulcrum and effecting a telescopic movement together with the steering shaft in axis-directions, an electric assist motor unit attached to the steering column and serving for a steering assist of the steering wheel, and a tilt/telescopic adjustment means for fixing the steering column in a predetermined angular position and fixing the steering column in a predetermined axis-directional position, wherein the tilt pivot is disposed between the electric motor unit and the tilt/telescopic adjustment means.

According to the present invention, there decrease both of a bending stress acting on a telescopic fitting slide portion and a load acting on the steering column upwardly of the tilt pivot.

EMBODIMENT OF THE INVENTION

An embodiment of the present invention will hereinafter be described with reference to the drawings.

Figure 1:
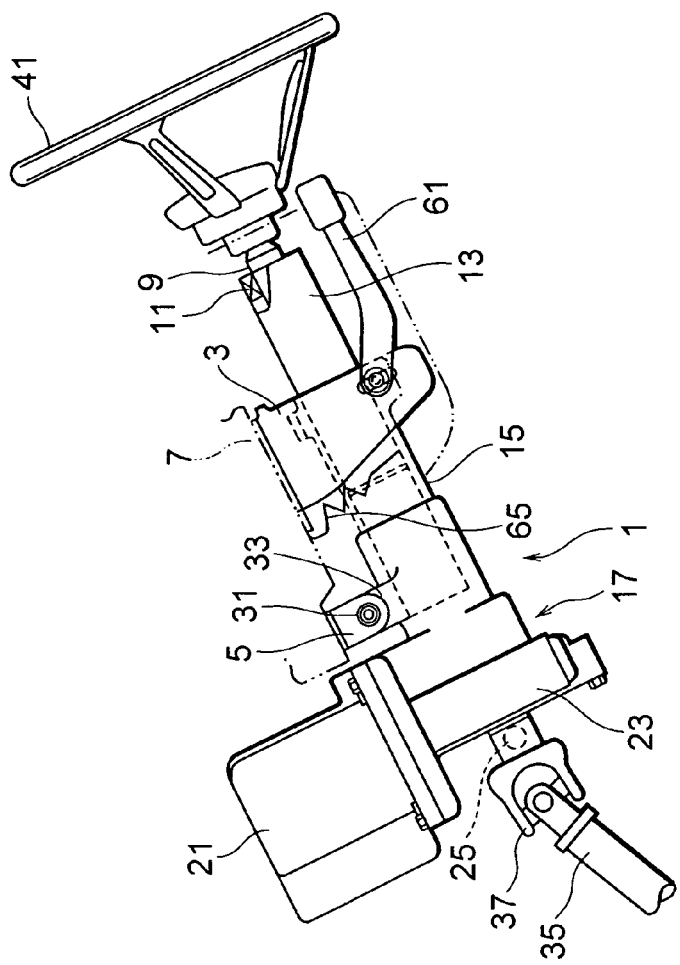
FIG. 1 is an explanatory view showing a vehicle compartment sided structure of a steering apparatus according to the present invention.
Figure 2:
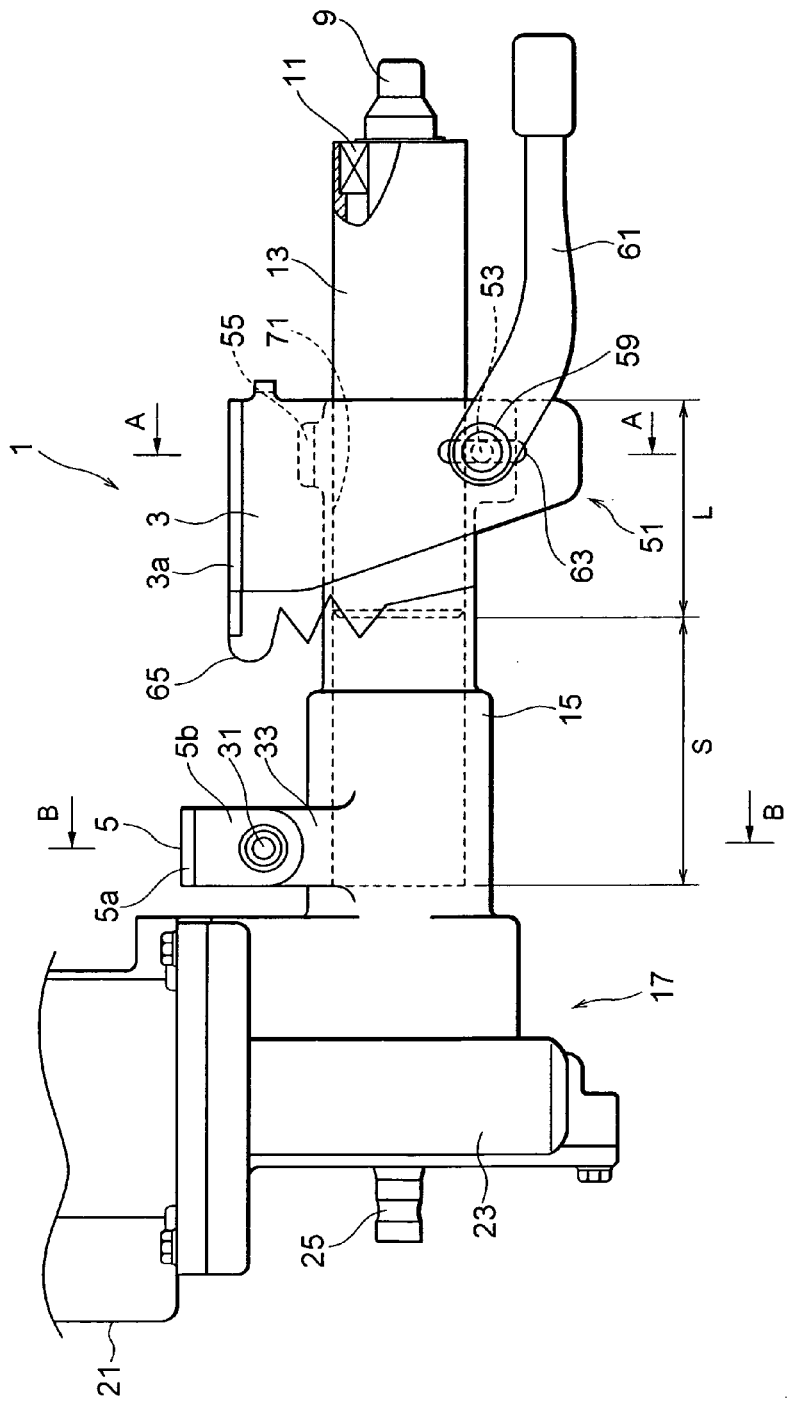
FIG. 2 is a side view of a steering column according to a first embodiment of the present invention.

FIG. 1 is a side view showing a vehicle compartment sided portion of an electric power steering apparatus according to a first embodiment of the present invention. FIG. 2 is a side view of a steering column. As illustrated in FIGS. 1 and 2, a steering column 1 is supported on a cross member 7 defined as a vehicle body structural member through respective horizontal portions 3a and 5a of an upper bracket 3 and a lower bracket 5. The steering column 1 is constructed mainly of the upper column 13 for rotatably holding, via a bearing 11, an upper shaft 9 of a steering shaft having a telescopic adjustment function and a collapsing function for absorbing energy, an outer jacket 15 in which the upper column 13 is slidably fitted, and an electric assist mechanism 17 integrally provided at a lower side end of the outer jacket 15.

The electric assist mechanism 17 is constructed of an electric motor unit 21, a speed reducing gear housing 23 that accommodates a speed reducing gear train for transferring rotational driving force given from the electric motor unit 21 to an output shaft 25 provided at a front end of the steering shaft, a torque sensor (unillustrated) for a steering torque applied to the steering wheel 41, and so forth. In the case of the present embodiment, the outer jacket 15 and the speed reducing gear housing 23 are formed as an integrally molded product formed of an aluminum alloy as a material. The outer jacket 15 and the gear housing 23 may also be formed separately and then assembled into one united body by pressfitting and the like. A lower end of the electric motor unit 21 is fixed to a rearsided upper surface of the speed reducing gear housing 23. A pivot bracket 33 is integrally formed on an upper portion of the outer jacket 15 behind the electric motor unit 21 and the speed reducing gear housing 23. The pivot bracket 33, which is a countertype of the lower bracket 5, is connected to the lower bracket 5 in such a way that a pivot pin 31a is inserted through through-holes formed in vertical portions 5b of the lower bracket 5 and fastened by a nut 31b via bushes 100. In FIG. 1, the numeral 35 designates a steering intermediate shaft connected to a front end of the output shaft 25 through a universal joint 37. The intermediate shaft 35 is defined as a telescopic shaft and connected to a rack-and-pinion mechanism of a steering mechanism that is provided at a lower part of the car body.

The steering wheel 41 is fitted to a rear end of the steering upper shaft 9. When a driver rotates the steering wheel 41, rotational force thereof is, after being increased with an assistance of the electric assist mechanism 17, transferred to the steering intermediate shaft 35 via the output shaft 25 and further to the aforementioned rack-and-pinion mechanism through an unillustrated lower-sided universal joint.

Figure 3:
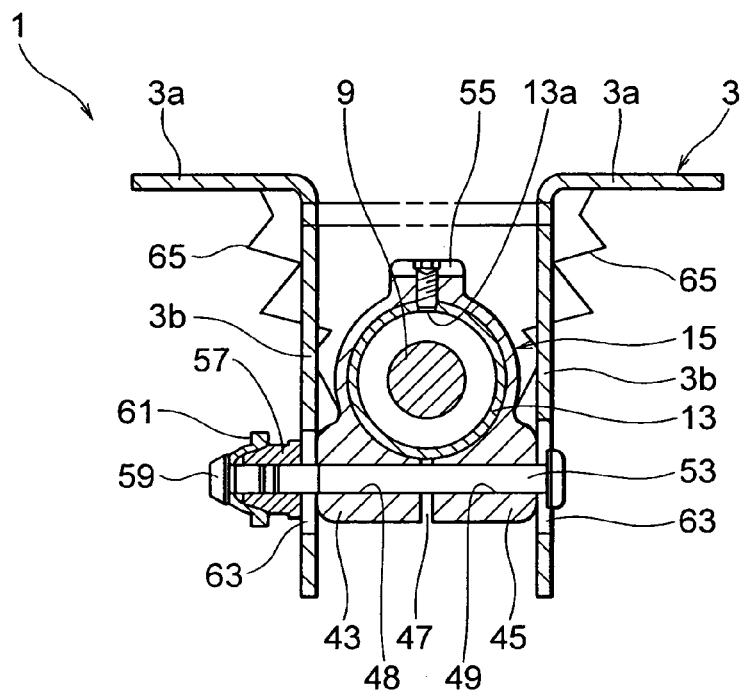
FIG. 3 is a sectional view taken along the line A—A in FIG. 2.
Figure 4:
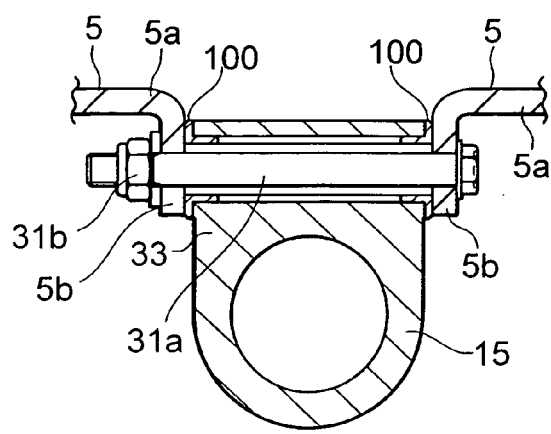
FIG. 4 is a sectional view taken along the line B—B in FIG. 2.
Figure 5:
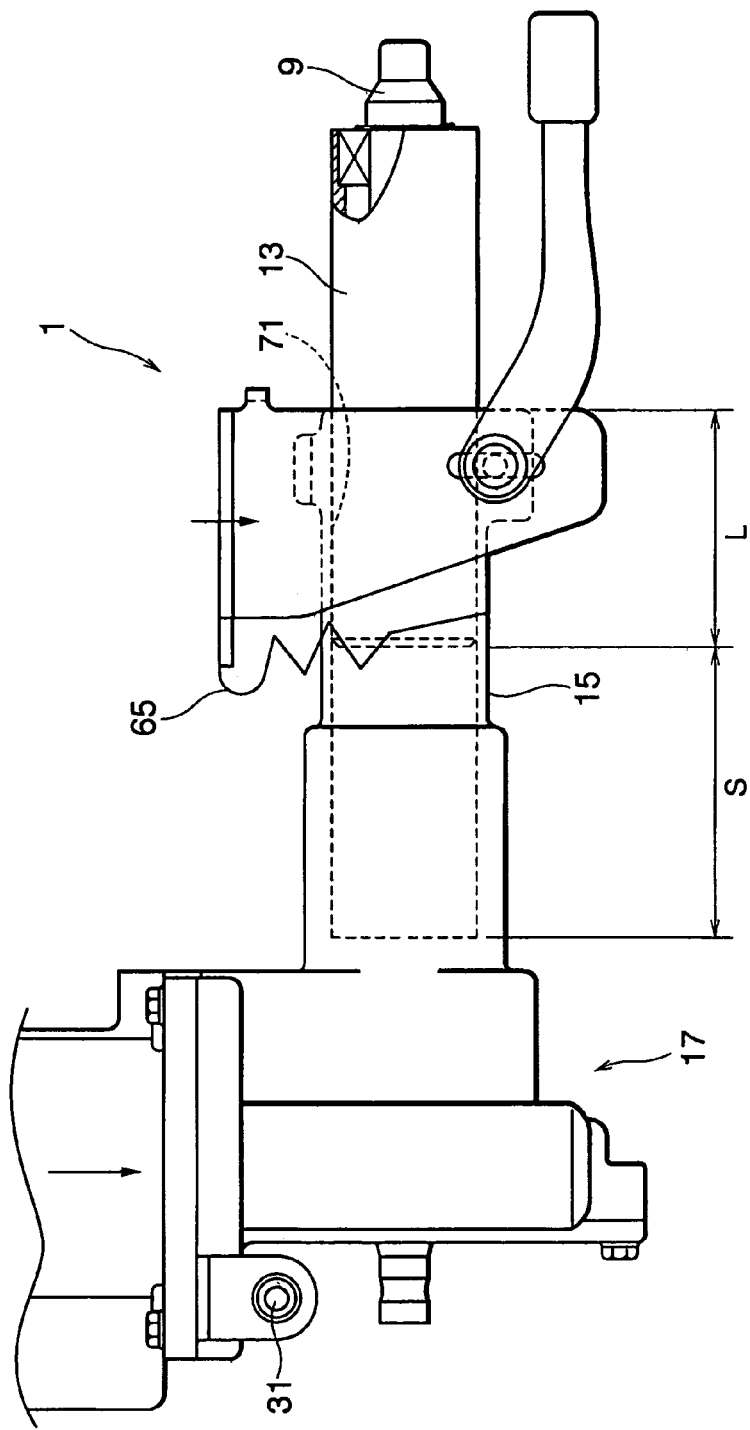
FIG. 5 is a side view showing one example of a conventional steering column.

As shown in FIG. 3 (which is a sectional view taken along the line A—A in FIG. 2), a couple of right-and-left bosses 43, 45 abutting on internal wall surfaces of vertically extending portions 3b, 3b of the upper bracket 3, are integrally formed so as to protrude from the lower portion of the rear end of the outer jacket 15. Then, a slit 47 is formed extending in the axial direction at the center of the lower portion of the outer jacket 15. Further, through-holes 48, 49 coaxial with each other are formed in the two bosses 43, 45. An adjustment bolt 53 as a component of a tilt/telescopic adjustment mechanism 51 is inserted through these through-holes 48, 49. A guide bolt 55 is provided inwards in a radial direction on an upper portion of the outer jacket 15, and a front side end of the guide bolt 55 engages with a groove 13a formed extending in the axial direction in a corresponding position of an upper portion of the upper column 13, whereby the guide bolt 55 guides the upper column 13 when in a telescopic operation and serves as a stopper when making a telescopic adjustment.

The tilt/telescopic adjustment mechanism 51 includes, in addition to the aforementioned adjustment bolt 53, an adjusting nut 57 screwed onto the adjustment bolt 53 and an operation lever 61 fastened to the adjustment nut 57 by a bolt 59. In the case of the present embodiment, a truncated cone portion of the adjustment nut 57 is taperfitted in a truncated cone recessed portion of the operation lever 61. When rotating the operation lever 61 counterclockwise, the upper bracket 3 is fastened by the adjustment nut 57 and the adjustment bolt 53. When rotating the operation lever 61 clockwise, the upper bracket 3 is released from being fastened. In FIG. 3, the numeral 63 represents elongate holes formed in the upper bracket 3, and the adjustment bolt 53 moves along within this elongate hole 63 when in a tilting operation. Further, members indicated by the numeral 65 in FIG. 3 are tilt assist springs stretched between the upper bracket 3 and the outer jacket 15. When the upper bracket 3 is released from being fastened through the operation of the operation lever 61, elastic force of the tilt assist springs 65 prevents an abrupt movement of the steering column.

An operation of the present embodiment will hereinafter be described.

If the steering wheel 41 gets improper in its position due to a replacement of the driver, etc., according to the electric power steering apparatus in the first embodiment, the driver at first rotates the operation lever 61 clockwise, thereby slackening the adjustment nut 57 from the adjustment bolt 53. Hereat, there dissipates an axial force of the adjustment bolt 53, which has been acting on the upper bracket 3 and on the bosses 43, 45 of the outer jacket 15, with the result that the steering column 1 becomes swingable by a predetermined quantity about the pivot pin 31 as a fulcrum and at the same time the upper column 13 gets slidable by a predetermined quantity on the outer jacket 15. This being done, the driver can adjust the steering wheel 41 in a desired position by tilting or telescopically moving the steering column 1.

Upon finishing the positional adjustment of the steering wheel 41, the driver rotates the operation lever 61 counterclockwise, thereby fastening the adjustment nut 57 against the adjustment bolt 53. Then, a predetermined axial force occurs upon the adjustment bolt 53, whereby the upper bracket 3 is press-fitted to the bosses 43, 45, and simultaneously the upper column 13 is secured as a diameter of the outer jacket 15 is reduced. The tilt and telescopic adjustments of the steering column 1 are thereby completed, and the steering wheel 41 is fixed in the desired position.

According to the present embodiment, since the pivot pin 31 for the tilt adjustment is positioned behind the electric motor unit 21, a centroidal position of the electric motor is (sic) and, a bending stress caused by a weight of the electric assist mechanism 17 does not act on a fitting slide portion 71 between the upper column 13 and the outer jacket 15. As a result, torsional blocking is hard to occur between the upper column 13 and the outer jacket 15, whereby a smooth telescoping motion can be attained. Further, a length L of the fitting slide portion 71 can be comparatively made short for the same reason. It is therefore possible to ensure both of a sufficient telescopic stroke S of the upper column 13 and a sufficient collapsing stroke of the steering upper shaft 9, whereby a degree of freedom for the positional adjustment of the steering wheel and the safety of an occupant (driver) against a secondary collision are improved.

On the other hand, according to the present embodiment, the electric motor unit 21 is positioned anterior to the pivot pin 31, while the tilt/telescopic adjustment means is positioned posterior to the pivot pin 31, thereby improving a weight balance between the anteriority and the posteriority to the pivot pin 31. This improvement does not require great spring force of the tilt assist spring 65 and enables the tilting operation to be conducted easily and smoothly.

The discussion on the specific embodiment is finished so far, however, the mode of the present invention is not limited to the embodiment described above. For example, the tilt pivot 31 is provided upwardly of the steering shaft in the embodiment discussed above and may also be provided downwardly. Further, the tilting direction and telescopic direction of the steering column are fixed by use of the single operation lever and may also be adjusted by dedicated pieces of operation levers. Moreover, the specific constructions, etc. of the electric assist mechanism enumerated first, the tilt mechanism and the telescopic mechanism can be properly changed if within the scope that does not deviate the gist of the present invention.

As discussed above, in the electric power steering apparatus according to the present invention, there are decreases in the bending stress acting on the telescopic fitting slide portion and in the load acting on the upper portion of the tilt adjusting pivot, thereby enabling the telescopic adjustment operation and the tilt adjustment operation to be performed smoothly. In addition, the length of the fitting slide portion between the upper column and the outer jacket can be made comparatively short, and it is therefore feasible to ensure the sufficient telescopic stroke of the upper column and the sufficient collapsing stroke of the upper shaft and to improve both the degree of freedom for the positional adjustment of the steering wheel and the safety of the occupant (driver) against the secondary collision.

What is claimed is:

1. An electric power steering apparatus, comprising:
  a steering shaft having an upper end to which a steering wheel is fitted;
  a steering column rotatably supporting said steering shaft, tilting about a pivot as a fulcrum and moving telescopical together with said steering shaft in axial directions;
  an electric assist motor unit attached to said steering column and serving for a steering assist of said steering wheel; and
  tilt/telescopic adjustment means for fixing said steering column in a tilt-adjusted angular position and fixing said steering column in a telescopically adjusted axial-directional position,
  wherein said pivot is disposed between said electric motor unit and said tilt/telescopic adjustment means, and above said steering shaft.

2. An electric power steering apparatus, comprising:
  a steering shaft having an upper end to which a steering wheel is fitted;
  a steering column rotatably supporting said steering shaft, said steering column being tiltable about a pivot and movable telescopically together with said steering shaft in axial directions;
  an electric assist motor unit attached to said steering column and providing a steering assist for said steering wheel; and
  a tilt/telescopic adjustment mechanism operable to adjustably fix tilt and telescopic positions of said steering column,
  wherein said pivot is disposed between said electric motor unit and said tilt/telescopic adjustment mechanism, and above said steering shaft.

* * * * *